United States Patent
Reeves

(10) Patent No.: US 9,303,241 B2
(45) Date of Patent: Apr. 5, 2016

(54) APPARATUS, SYSTEM AND METHOD FOR ADDING HOPS OR OTHER INGREDIENTS TO BEVERAGE

(75) Inventor: Jonathan Reeves, Alexandria, VA (US)

(73) Assignee: Port City Brewing Company, Alexandria, VA (US)

( * ) Notice: Subject to any disclaimer, the term of this patent is extended or adjusted under 35 U.S.C. 154(b) by 588 days.

(21) Appl. No.: 13/458,818

(22) Filed: Apr. 27, 2012

(65) Prior Publication Data

US 2013/0202736 A1  Aug. 8, 2013

Related U.S. Application Data

(60) Provisional application No. 61/595,147, filed on Feb. 5, 2012.

(51) Int. Cl.
*C12C 3/00*       (2006.01)
*C12C 13/00*      (2006.01)

(52) U.S. Cl.
CPC .. *C12C 3/00* (2013.01); *C12C 13/00* (2013.01)

(58) Field of Classification Search
CPC .......... C12C 3/00; C12C 5/026; C12C 11/11; C12C 11/003; C12C 3/06; C12C 5/02; C12C 11/00; C12C 12/00
USPC .......... 426/600, 11, 16, 592; 99/278
See application file for complete search history.

(56) References Cited

U.S. PATENT DOCUMENTS

| | | | |
|---|---|---|---|
| 218,231 A | 8/1879 | Clausen et al. | |
| 450,534 A | 4/1891 | Schneider | |
| 553,269 A | 1/1896 | Sobotka et al. | |
| 2,772,975 A | 12/1956 | Rickers | |
| 3,155,431 A | 11/1964 | Baldwin | |
| 4,583,883 A | 4/1986 | Johanning | |
| 4,592,679 A | 6/1986 | Boiting et al. | |
| 4,846,608 A | 7/1989 | Sanders | |
| 5,073,396 A | 12/1991 | Todd, Jr. | |
| 5,783,235 A | 7/1998 | Ting et al. | |
| 2012/0237654 A1* | 9/2012 | Roth | 426/475 |

FOREIGN PATENT DOCUMENTS

| | | |
|---|---|---|
| DE | 2228497 A1 | 1/1974 |
| JP | 2004-261116 A | 9/2004 |
| SU | 1446145 A1 | 12/1988 |

* cited by examiner

*Primary Examiner* — Vera Stulii
(74) *Attorney, Agent, or Firm* — Kenealy Vaidya LLP

(57) ABSTRACT

A method and apparatus for dry hopping a beverage contained in a fermentation tank can include providing a hops vessel defining an interior space. The method can include adding hops to the interior space of the hops vessel, sealing the interior space of the hops vessel from ambient atmosphere, and propelling at least a portion of the hops from the interior space of the hops vessel into a supply hose, closing an exit port valve, and opening a bypass valve which is in fluid communication with a top portion of the hops vessel and the supply hose thereby propelling hops remaining in the supply hose into the fermentation tank.

10 Claims, 4 Drawing Sheets

APPARATUS, SYSTEM AND METHOD FOR ADDING HOPS OR OTHER INGREDIENTS TO BEVERAGE

LIST OF RELATED APPLICATIONS

This application and invention claims the priority benefit under 35 U.S.C. §119 of U.S. Provisional Patent Application No. 61/595,147 filed on Feb. 5, 2012, which is hereby incorporated in its entirety by reference.

BACKGROUND

1. Field

The presently disclosed subject matter relates to an apparatus, system and method for adding hops to a beverage, and more specifically relates to an apparatus, system and method for adding hops to a fermentation tank while preventing oxygen infiltration during a process for making a beverage, such as beer.

2. Description of the Related Art

Typically, the brewing process includes a series of sequential (and sometimes non-sequential) steps, which can include one or more of the following: malting, in which barley is converted to malt having a distinct flavor and containing a large amount of enzyme; milling, in which the malt is milled in order to make malt flour; mashing, in which the milled malt is mixed with water so as to form a mash; brewing the mash by applying a precise heating cycle to the mash while stirring; filtration, in which the mash is filtered in order to separate the wort (liquid containing the soluble matter dissolved in the water during the brewing) from the draff (insoluble matter); and cooking, in which the wort is subjected to heating/boiling, during which hops, which gives the beer its bitterness, can be added; fermentation, in which the wort is inoculated with a yeast of the Saccharomyces genus, which will, through fermentation, convert fermentable sugars to alcohol and to carbon dioxide; and standing, in which the beverage is stored at approximately 32° F./0° C. for a period which varies from a few days to a few weeks. The resulting beverage is a young beer, or ale, that can be filtered to remove the yeasts and any particulate residue or matter in suspension (precipitates of polyphenols, proteins, carbohydrates, etc.). The beer is then ready for tapping off, in which the beer is pasteurized and placed in barrels, bottles, growlers, cans, or alternative storage receptacles.

During some of the above processes, there is a risk of oxidation of the subject ingredients, thereby leading to a possibility of depreciated taste and/or freshness of the final product. For example, oxidation of the mash (the mixture of crushed malt and water) may occur at the time of brewing, oxidation of the wort may occur during the cooking step, and oxidation of the hops can occur during introduction of the hops in the cooking process.

Currently, brewers take many precautions to avoid oxidation of ingredients during the above processes. In particular the hops are typically pelletized, bathed in nitrogen, and then stored in vacuum packed oxygen-barrier materials (such as aluminum packs) to ensure little or no contact with oxygen after the hops are made ready for use. It is only just before introduction of hops into a fermentation tank does the vacuum packed seal get broken and the hops delivered to the fermentation tank. The fermentation tank is then immediately re-sealed after the hops are delivered. Venting of the carbon dioxide that is produced during the fermentation process is then allowed to continue via a check-valve style vent arm attached to the fermentation tank that also prevents atmosphere/oxygen from entering the fermentation tank.

With regard to the hops ingredient, hops are generally known as a primary ingredient in the manufacture of beer. The art of using hops in beer has been changing over the last decades from the direct addition of hops to the wort during its boil, to the use of solvent extracts of hops and of hop pellets, to the use of preisomerized purified hop iso-alpha acids (iso-humulones), and now to the use of carbon dioxide hop extracts. The direct introduction of hops or pelletized hops into the fermented beer is commonly known as "dry hopping." An alternative way to introduce hops to the brewing ingredients is by injecting a hops extract into the fermentation tank. The extract can be transferred to the fermentation tank via a closed system in which the hops extract in liquid form is injected into the fermentation tank directly from a hops extract tank, thus minimizing exposure of the hops extract to oxygen.

The resin complex of hops includes humulones (alpha-acids), lupulones (beta-acids), uncharacterized soft resins and 'hard resins' (oxidation products of alpha- and beta-acids). During heating or other processing in the brewery, the water-insoluble humulones are converted into soluble isohumulones. The isohumulone content plays a role in determining the level of bitterness in the final beverage product.

It is these alpha-acids that may be subject to deterioration by oxidation during hop storage, hop transfer, and hop use. When oxidation occurs, the alpha-acids complex is then converted into hard resins. In the past, in order to prevent this oxidation, the hops have been pelletized and packaged under vacuum in pellet bags as described above, which slows down the rate of deterioration. However, traces of oxygen remain after evacuation and sealing of the pellet bags, and the residual oxygen is capable of causing some further product deterioration. In addition, during transfer of the hops to the fermentation tank, the hops and the ingredients in the fermentation tank can be exposed to a significant amount of oxygen.

In the past, brewers have added an antioxidant material to the hops, such as ascorbic acid (vitamin C). In this case, the ascorbic acid is preferentially oxidized and prevents the hops from oxidizing. Brewers have also attempted to transfer the hops into the fermentation tanks in an environment that does not include oxygen by using elaborate storage and transfer structures.

Despite all of these efforts there remains a long felt need to continually reduce the amount of exposure of hops and other ingredients in the brewing process to oxygen during the brewing process.

SUMMARY

In accordance with an aspect of the disclosed subject matter, a method for dry hopping a beverage contained in a fermentation tank can include providing a hops vessel having a top portion and a bottom portion and defining an interior space, a fill port located at the top portion of the hops vessel, an inert gas port located at the top portion of the hops vessel, an inert gas port valve located adjacent the inert gas port, an exit port located at the bottom portion of the hops vessel, an exit port valve located adjacent the exit port, a branch tube connected to the exit port via the exit port valve, and a bypass tube in fluid communication with the top portion of the hops vessel and connected to the branch tube via a bypass valve. The method can further include closing the exit port valve of the hops vessel, adding hops to the interior space of the hops vessel, sealing the interior space of the hops vessel from ambient atmosphere, connecting a pressurized inert gas supply to the inert gas port such that inert gas is in fluid communication with the interior space of the hops vessel, purging the hops vessel of ambient atmosphere using the pressurized inert gas supply, connecting a supply hose between the exit port of the hops vessel and the fermentation tank, pressurizing the interior space of the hops vessel with the pressurized inert gas supply, opening the exit port valve and thereby propelling at least a portion of the hops from the interior space of the hops vessel into the supply hose, closing the exit port valve, and opening the bypass valve which is in fluid communication with the top portion of the hops vessel and the supply hose thereby propelling hops remaining in the supply hose into the fermentation tank.

In accordance with another aspect of the disclosed subject matter, a system for adding hops to a fermentation tank can include a hops vessel having a top and a bottom and defining an interior space configured to receive hops. A fill port can be located at the top of the hops vessel and in communication with the interior space. A cover can be located adjacent to the fill port and configured to selectively close the fill port. A gas tube can be connected at the top of the hops vessel in selective fluid communication with a pressurized supply of inert gas, and in fluid communication with the interior space of the hops vessel. A branch pipe can extend from the bottom of the hops vessel and in fluid communication with the interior space, the branch pipe including a first opening, a second opening, and a third opening. A first valve intermediate the hops vessel and the first opening of the branch pipe can be configured to selectively open and close fluid communication between the interior space of the hops vessel and the first opening of the branch pipe. A supply hose can be in fluid communication with the second opening of the branch pipe and configured for connection to a vent arm in fluid communication with inert gas under pressure in the fermentation tank. A by-pass pipe can be connected at one end to the top of the hops vessel and in fluid communication with the interior space. A by-pass valve can be located intermediate another end of the by-pass pipe and the third opening of the branch pipe, the by-pass valve being configured to selectively open and close fluid communication between the interior space of the hops vessel and the third opening of the branch pipe.

Additional features, advantages, and embodiments of the disclosed subject matter may be set forth or apparent from consideration of the following detailed description, drawings, and claims. Moreover, it is to be understood that both the foregoing summary of the disclosed subject matter and the following detailed description are exemplary and intended to provide further explanation without limiting the scope of the disclosed subject matter as claimed.

BRIEF DESCRIPTION OF THE DRAWINGS

These and other aspect of the presently disclosed subject matter will become clear from the following description with reference to the accompanying drawings, wherein.

DETAILED DESCRIPTION OF EXEMPLARY EMBODIMENTS

The presently disclosed subject matter will be described in detail hereinafter with reference to exemplary embodiments shown in the accompanying drawings.

Figure 1:
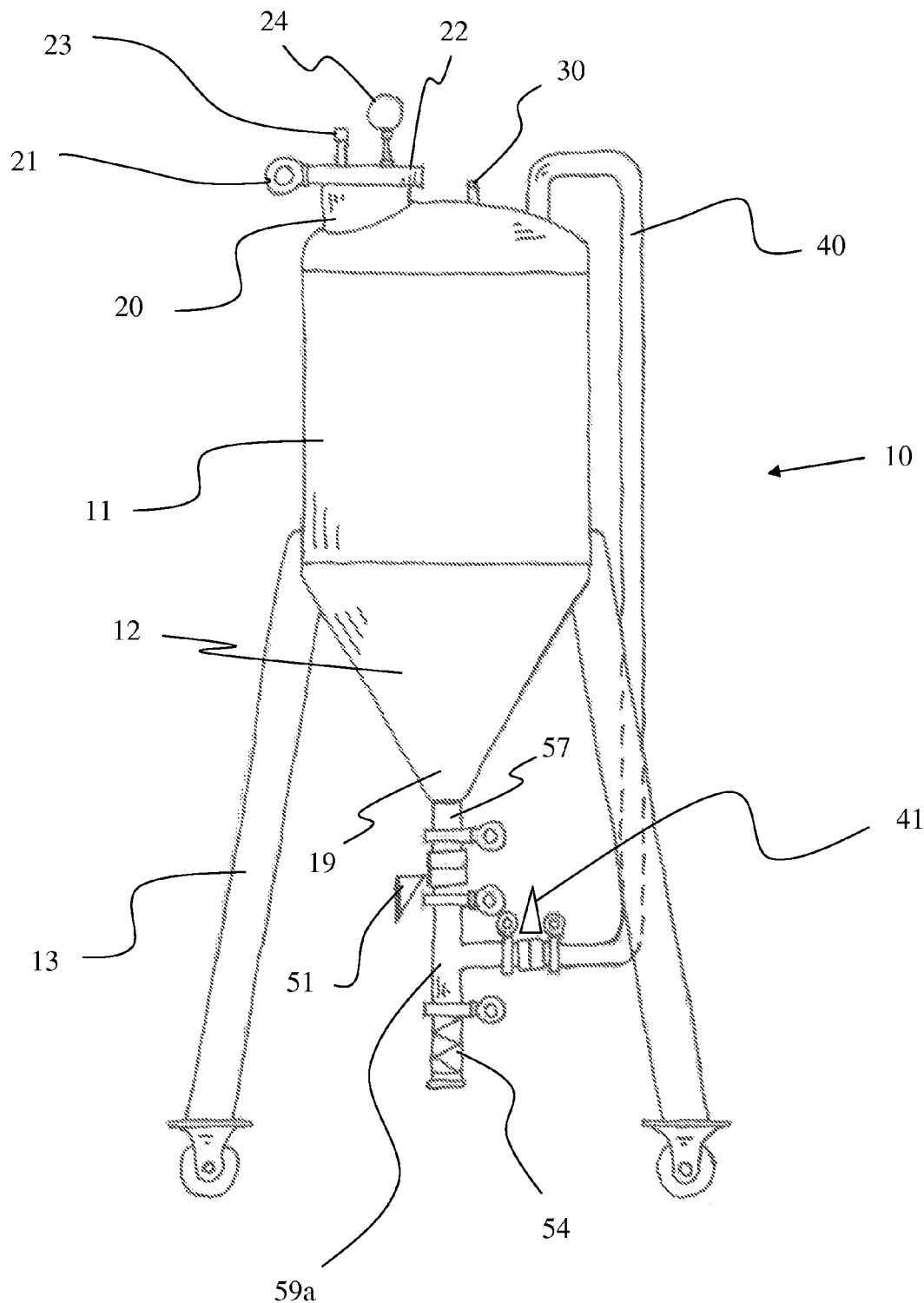
FIG. 1 is a front view showing an exemplary embodiment of a hops cannon made in accordance with principles of the disclosed subject matter.

FIG. 1 is a front view of an example of a hops dosing device or hops cannon 10 made in accordance with principles of the disclosed subject matter. The hops cannon 10 can include a main body 11 shaped as an upright cylinder which terminates at a cone shaped lower end section 12 to form an exit port 19. Diametrically opposed sections of the wall of the cone shaped section 12 can be positioned substantially 60 degrees with respect to each other. The exit port 19 of the hops cannon 10 can be formed as, or connectable to, a material pipe 57. The upper portion of the main body 11 can be sealed or releasably sealed with an upper cover portion which, in the embodiment depicted in FIG. 1, is a dome shaped portion welded to a cylindrical portion of the main body 11.

A material port 20 can be located in the dome shaped portion of the main body 11 and can be sized to allow input of various ingredients (e.g., hops) into the hops cannon 10. The port 20 can include a lid plate 22 that is rotatable about a hinge 21 to securely open and close the entryway to the port 20. The lid plate 22 can include a clasp lock to secure the lid plate 22 when in the closed position to securely seal the port 20 of the hops cannon 10. A gasket, o-ring or other sealing structure can be mounted to the lid plate 22 or to the rim of the material port 20 to effect a substantially (total or almost total) fluid tight seal between the lid plate 22 and the port 20. A pressure sensor 24 can be provided in the lid plate 22 to provide an operator of the hops cannon 10 with a pressure reading related to pressure within main body 11 of the hops cannon 10. A fluid connection 23 can also be provided in the lid plate 22 for connection to an outside fluid supply/source, such as a carbon dioxide reservoir 80. A release valve 30 can be located in a top portion of the main body 11 to allow for release of excess fluid pressure that may build up in the main body 11 during operation.

As indicated above, an exit port 19 can be formed at the bottom of the cone section 12 of the hops cannon 10 such that ingredients located in the hops cannon 10 can be discharged via material pipe 57. A material valve 51 located on the material pipe can be provided in order to regulate flow of material out of the hops cannon 10 in a manner described in more detail later. A "tee" 59a can be located immediately below the material valve 51 and include an exit branch connected to a sight glass 54 which, in turn, can be connected to an outlet line 53 formed as a hose or pipe or other type of discharge tube. A middle branch of the tee 59a can be connected to a bypass pipe 40 that extends from and is in fluid communication with a top portion of the main body 11. In particular, the bypass pipe 40 can be formed as a pipe that extends from an opening in the upper cover portion of the main body 11 to the middle branch of the tee 59a. A bypass valve 41 can be located between the middle branch of the tee 59a and the bypass pipe 40 to regulate the fluid connection between the upper portion of the main body 11 and the tee 59a.

Figure 2:
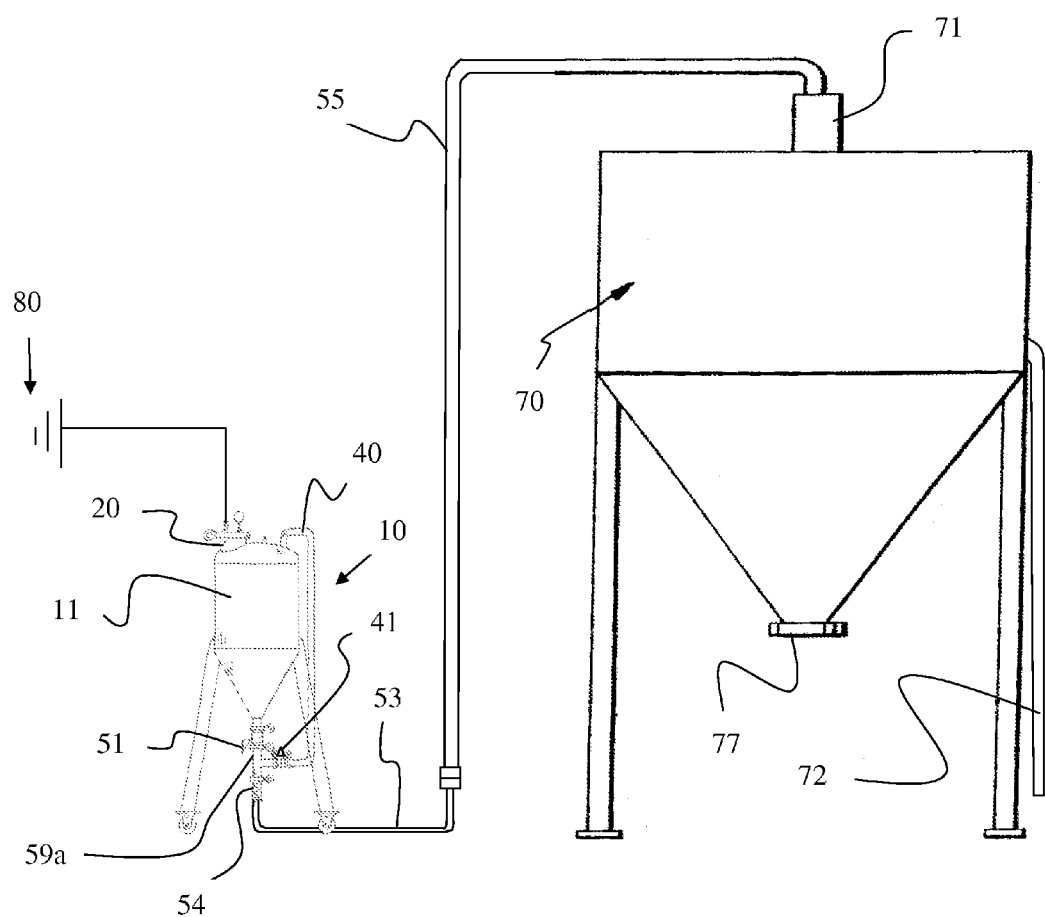
FIG. 2 is a front view showing an exemplary embodiment of a system for adding hops to a beverage made in accordance with principles of the disclosed subject matter.

FIG. 2 shows a system for adding hops and other ingredients to a beverage including a hops cannon 10 connected to a fermentation tank 70 via a series of hoses and pipes. The hops cannon 10 as described above can have an outlet hose 53 connected thereto, for example, at an exit end of the sight glass 54. The outlet hose 53 can terminate at a connector, which can be releasably connected to a mating connector located at an inlet end of an inlet pipe 55 which is ultimately connected to a top portion of the fermentation tank 70 via a top port 71. The fermentation tank 70 can include a number of structures, including pressure gauges, temperature gauges, heaters, coolers, pressure relief valves, stirring structures, etc., for processing the final beverage. A vent arm 72 can be provided on the fermentation tank 70 to allow excess carbon dioxide that is produced during the fermentation process to escape from the fermentation tank 70. In an alternate embodiment, the outlet hose 53 extending from the hops cannon 10 can be connected directly to this vent arm 72 for introduction of the hops and/or other ingredients to the fermentation tank 70 via the vent arm 72. In this manner, a separate inlet hose 54 is not necessary for introducing the ingredients to the fermentation tank 70. An exit port 77 can be located at a bottom cone shaped section of the fermentation tank 70 to allow for distribution of the beverage into barrels, bottles, growlers, etc.

Figure 3:
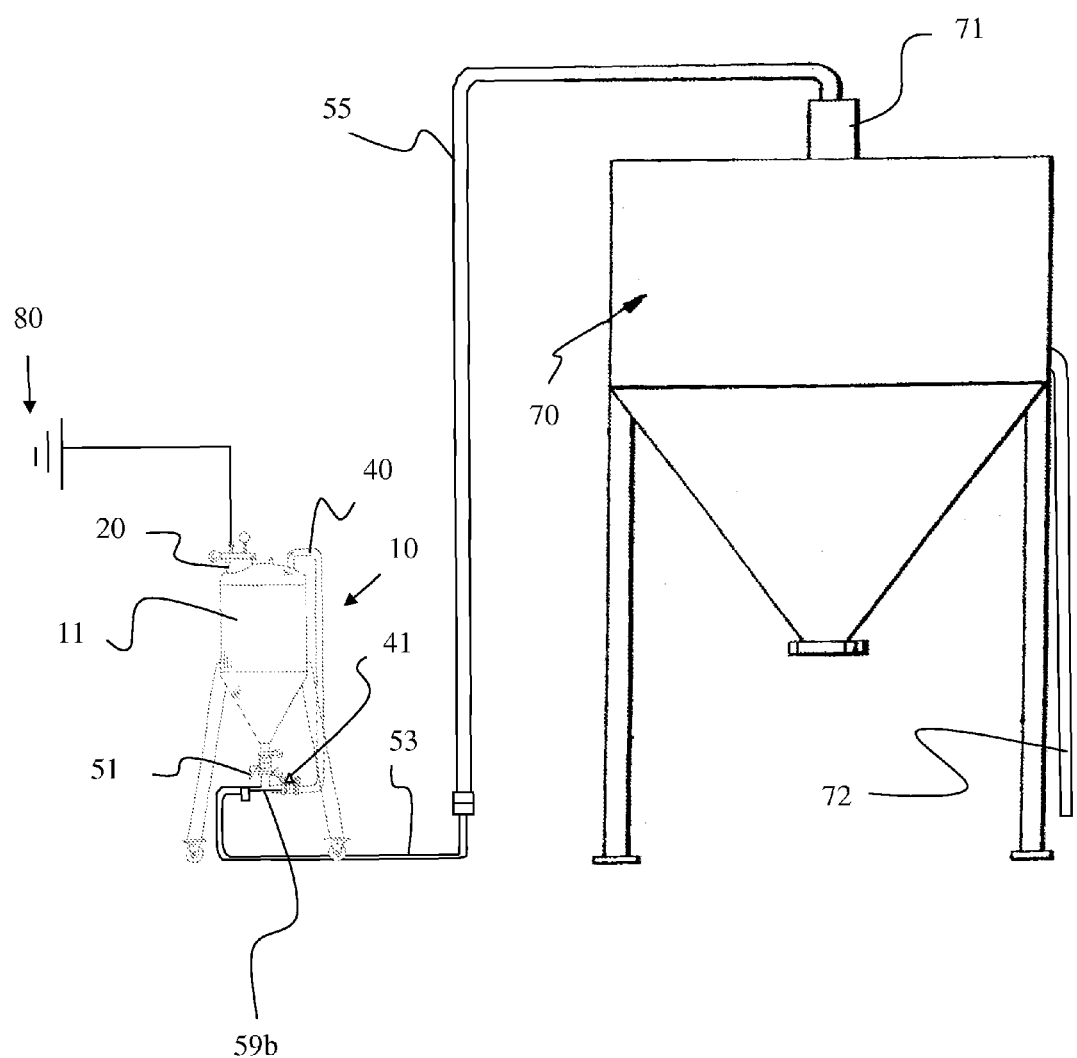
FIG. 3 is a front view showing another exemplary embodiment of a system for adding hops to a beverage made in accordance with principles of the disclosed subject matter.

FIG. 3 shows another embodiment of a hops cannon 10 and system for adding hops and other ingredients to a beverage. In this embodiment, the tee 59a is replaced with differently shaped tee 59b in which the portion extending between the bypass valve 41 and the connection to the sight glass 54 or outlet hose 40 is substantially straight and has an interior cross-section that is narrower at the location where the material pipe 57 connects via material valve 51 to the tee 59a than a cross section of the pipe, hose, or tube located at inlet and outlet portions extending to and from the location at which the material pipe 57 connects to the tee 59a. Thus, a venturi effect can be created at the material pipe 57 inlet into the tee 59b that allows for increased discharge velocity of materials from the material pipe 57 into the tee 59b and ultimately increased discharge efficiency to the fermentation tank 70. The reduced cross section of tee 59b can be accomplished in many different ways, including designing the tee 59b to have an interior cross-section that is narrower than both the inlet and outlet pipes/tubes to which the tee 59b is connected. Alternatively, the straight portion of the tee 59b can include a narrowing portion at the junction of the tee to create the venturi effect. Further, the straight portion of the tee 59b can be narrower in cross section than the tube or pipe to which each end of the straight portion of the tee 59b is connected.

Figure 4:
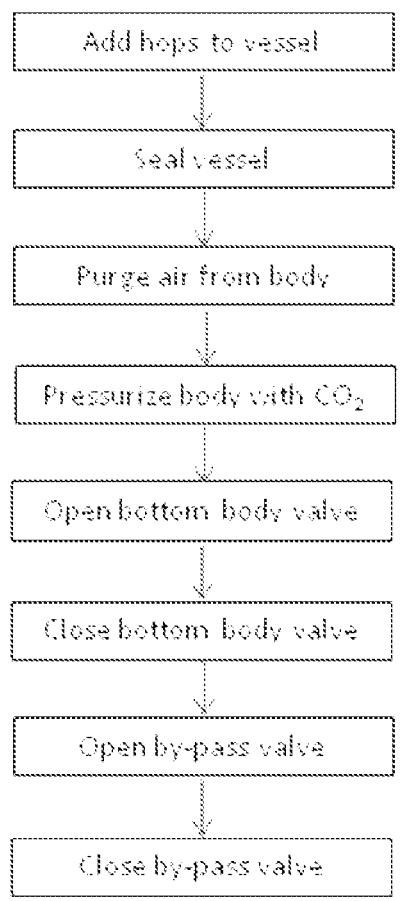
FIG. 4 is a block diagram depicting an exemplary method in accordance with principles of the disclosed subject matter.

FIG. 4 is a block diagram depicting an example of a method for introducing hops into a fermentation tank in accordance with principles of the disclosed subject matter. At the outset, the hops cannon 10 can be sterilized using a variety of different processes, including steam cleaning or using a steam jacket to clean by elevating the temperature of the hops cannon 10 without contacting the hops cannon 10 with water. Once the interior space of the hops cannon 10 is sterile and dry, a vacuum pack or packs of pelletized hops can be broken open and placed into the main body 11 via the material port 20. The lid plate 22 can then be closed and sealed in an air tight manner. A gas line that is connected to the lid plate 22 can then be opened to purge the interior of the main body 11 of the hops cannon 10 of atmospheric gases, which will be replaced with the gas from the open gas line. The gas can be an inert gas that does not include oxygen, and can be, for example, carbon dioxide gas. The atmosphere can be vented from the hops cannon 10 via different ports, such as through the pressure relief valve 30, or through the material pipe 57 and/or bypass pipe 40 and ultimately out of the system via hose 53, until the only fluid remaining in the hops cannon 10 is carbon dioxide (i.e., until the only fluid being vented is carbon dioxide). Typically this purging process takes a few minutes, but can take longer or shorter depending on the amount of hops in the hops cannon 10, the pressure of the gas line, the size of each of the fittings and tubes/pipes, etc.

Once the hops cannon 10 is sufficiently purged of atmosphere, all vent openings can be closed or sealed and the outlet hose 53 can be connected to the inlet pipe 55 of the fermentation tank 70. The pressure inside the hops cannon 10 can then be allowed to increase to, for example, 0.3 MPa.

When the pressure inside the hops tank 10 reaches approximately 0.25-0.3 MPa, the material valve 51 (bottom body valve) can be opened to allow hops to move under pressure from main body 11 through valve 51 and into the sight glass 54. The hops will then become viewable in the sight glass 54, and will stop movement (i.e., become plugged). At that point in time, the operator can close the material valve 51 and allow the pressure to build again in the hops cannon 10. The time from the opening to the closing of the material valve 57 can be a matter of a few seconds, e.g., 5 seconds. After closing the material valve 57, when the pressure reaches approximately 0.25-0.3 MPa, the bypass valve 41 can be opened to introduce an unfiltered (i.e., undamped by hops) pressure of carbon dioxide to those hops that remain located in the area of the sight glass 54 (in the sight glass 54 and possibly in the adjacent outlet hose 53 and tee 59a). The unfiltered pressure will cause the hops located in the area of the sight glass 54 to move from the area of the sight glass 54 towards and through the outlet hose 53 and eventually into the fermentation tank 70 via the inlet pipe 55.

Sometimes, the hops located around the sight glass 54 will not be fully discharged to the fermentation tank 70 when the bypass valve 41 is initially opened. In this case, an operator may be required to close the bypass 41 and allow the pressure in the main body 11 of the hops cannon 10 to again reach approximately 0.25-0.3 MPa. The bypass valve 41 can then be opened again to deliver a second wave of pressurized carbon dioxide to the hops located in the area of the sight glass 54. Hopefully, the hops will then be moved along the outlet hose 53 and through the inlet pipe 55 into the fermentation tank 70. This process of opening and closing the bypass valve 41 can be repeated until the hops located in the area of the sight glass 54 is finally discharged and moved into the fermentation tank 70.

In accordance with another exemplary embodiment of the method, the material valve 51 can also be opened and closed multiple times in order to move hops from the main body 11 to the area of the sight glass 54. The material valve 51 and the bypass valve 41 can also be opened and closed in an alternate fashion until the hops located in the area of the sight glass 54 is discharged into the fermentation tank 70. Opening and closing the material valve 51 in between opening and closing the bypass valve 41 will allow the hops located in the area of the sight glass 54 to move or become redistributed in nature. Thus, when a subsequent opening of the bypass valve 41 occurs, the redistributed hops will be more likely to be fully transferred to the fermentation tank 70.

The mobility of the hops through the system will depend on many different variables, including type, freshness, moisture content, and quantity of hops, as well as mechanical variables such as operating pressure of gas lines, size of lines, pipes and fittings, friction coefficients of surfaces, and environmental conditions such as heat, humidity, etc.

The disclosed subject matter can be accomplished using many structures and method processes that are different from those described above with respect to the exemplary and depicted embodiments. For example, any of the structures described as pipes can easily be refitted with a hose type structure, and vice versa. The term tube is intended to be a generic term referring to either a pipe or a hose. The pipes can be made from stainless steel, or any other known material for making and distributing beverages, such as aluminum, steel alloys, etc. The hops cannon 10 can form a 75 L containment body, but can be larger or smaller depending on particular application. The cross-sectional dimensions of each of the pipes and hoses can also vary depending on application and, for example, can be 3 inch diameter pipes and hoses. Each of the different portions of the hop cannon 10 can be welded together via, for example, an argon-arc welding process, or can be joined together using fittings, couplings and other mechanical attachment devices. Legs 13 with wheels at ends thereof can be provided on the main body 11 to allow the hops cannon 10 to be easily moved between different fermentation tanks. Alternatively, the hops cannon 10 can be permanently attached to a frame structure adjacent a fermentation tank. The fermentation tank 70 can be sized to create 120 barrel batches of beverage, but can be larger or smaller depending on a particular application.

The main body 11 of the hops cannon 10 is shown as a cylinder attached to a cone portion 12. However, these shapes can be varied, and can include a spherical main body shape (with or without cone shaped bottom portion), polygonal main body shape, and others.

It is also contemplated that the specific location of each of the ports of the hops cannon 10 can vary without departing from the spirit or scope of the disclosed subject matter. For example, the inlet port 20 can be located at a center of the top portion of the main body 11 instead of being offset as shown in FIG. 1. In addition, the inlet port 20 could be located on a sidewall of the main body 11. Likewise, the exit port 19 of the hops cannon 10 can be offset with respect to the central axis of the cone portion 12, and can be an asymmetrically located port if the portion 12 is not formed as a symmetrical cone.

The opening and closing of each of the bypass valve 41 and material valve 51 can be accomplished by hand or by a control unit connected to a solenoid or other actuation device for actuating each of the valves. The valves themselves can be any known type of valve that will allow both fluid and dry materials to pass therethrough when in the open position, and preventing both fluid and dry materials from passing therethrough in the closed position. In addition, although a sight glass 54 is shown in FIG. 1, the hops cannon 10 can also function adequately without a sight glass 54.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A method for dry hopping a beverage contained in a fermentation tank comprising:
   providing a hops vessel having,
      a top portion and a bottom portion and defining an interior space,
      a fill port located at the top portion of the hops vessel,
      an inert gas port located at the top portion of the hops vessel,
      an inert gas port valve located adjacent the inert gas port,
      an exit port located at the bottom portion of the hops vessel,
      an exit port valve located adjacent the exit port,
      a branch tube connected to the exit port via the exit port valve, and
      a bypass tube in fluid communication with the top portion of the hops vessel and connected to the branch tube via a bypass valve;
   closing the exit port valve of the hops vessel;
   adding hops to the interior space of the hops vessel;
   sealing the interior space of the hops vessel from ambient atmosphere;
   connecting a pressurized inert gas supply to the inert gas port such that inert gas is in fluid communication with the interior space of the hops vessel;
   purging the hops vessel of ambient atmosphere using the pressurized inert gas supply;
   connecting a supply tube between the exit port of the hops vessel and the fermentation tank;
   pressurizing the interior space of the hops vessel with the pressurized inert gas supply;
   opening the exit port valve and thereby propelling at least a portion of the hops from the interior space of the hops vessel into the supply tube;
   closing the exit port valve; and
   opening the bypass valve which is in fluid communication with the top portion of the hops vessel and the supply tube thereby propelling hops remaining in the supply tube into the fermentation tank.

2. The method for dry hopping a beverage contained in a fermentation tank according to claim 1, wherein pressurizing the interior space of the hops vessel includes supplying carbon dioxide pressurized at 0.25 MPa to 0.3 MPa to the hops vessel.

3. The method for dry hopping a beverage contained in a fermentation tank according to claim 1, wherein the hops vessel includes a relief valve configured to vent the inert gas from the interior space when the pressure of the interior space exceeds a preset limit.

4. The method for dry hopping a beverage contained in a fermentation tank according to claim 1, further providing a sight glass in fluid communication with the exit port, and viewing the hops within the sight glass to determine when to open the bypass valve.

5. The method for dry hopping a beverage contained in a fermentation tank according to claim 1, wherein the supply tube is a flexible hose, and connecting the supply tube between the exit port of the hops vessel and the fermentation tank includes connecting the flexible hose to a vent arm in fluid communication with carbon dioxide under pressure in the fermentation tank.

6. The method for dry hopping a beverage contained in a fermentation tank according to claim 1, increasing a velocity of the inert gas supply as it passes the exit port to draw hops from the exit port.

7. The method for dry hopping a beverage contained in a fermentation tank according to claim 1, further comprising pressurizing the interior space of the hops vessel with the pressurized carbon dioxide supply to substantially 0.25 MPa to 0.3 MPa for a second time.

8. The method for dry hopping a beverage contained in a fermentation tank according to claim 7, further comprising opening the bypass valve for a second time thereby propelling hops remaining in the supply tube into the fermentation tank.

9. The method for dry hopping a beverage contained in a fermentation tank according to claim 1, further comprising opening a valve located on the fermentation tank to purge an inlet tube leading to the fermentation tank of any atmospheric air, and subsequently connecting the supply tube between the exit port of the hops vessel and the tube leading to the fermentation tank.

10. The method for dry hopping a beverage contained in a fermentation tank according to claim 1, further comprising repeatedly opening and closing the bypass valve and repeatedly opening and closing the exit port valve.

* * * * *